(12) United States Patent
Nakamura et al.

(10) Patent No.: US 6,442,025 B2
(45) Date of Patent: Aug. 27, 2002

(54) COOLING UNIT FOR COOLING HEAT GENERATING COMPONENT AND ELECTRONIC APPARATUS HAVING THE COOLING UNIT

(75) Inventors: Hiroshi Nakamura, Ome (JP); Katsumi Hisano, Kashiwa (JP); Kentaro Tomioka, Sayama (JP); Hiroshi Aoki, Nagaoka (JP); Katsuhiko Yamamoto, Nagaoka (JP)

(73) Assignees: Kabushiki Kaisha Toshiba, Kawasaki (JP); Toshiba Home Techno Co., Ltd., Kamo (JP)

( * ) Notice: Subject to any disclaimer, the term of this patent is extended or adjusted under 35 U.S.C. 154(b) by 0 days.

(21) Appl. No.: 09/752,780

(22) Filed: Jan. 3, 2001

(30) Foreign Application Priority Data

Jan. 7, 2000 (JP) ........................................ 2000-001832

(51) Int. Cl.⁷ .............................................. H05K 07/20
(52) U.S. Cl. .................... 361/695; 165/104.33; 361/700
(58) Field of Search ......................... 361/687, 703–705, 361/695, 697–700, 717–719; 312/236; 124/15.2, 16.3; 165/80.3, 185, 104.33, 121–126; 62/3.2, 259.2; 257/714, 722

(56) References Cited

U.S. PATENT DOCUMENTS

| | | | | |
|---|---|---|---|---|
| 5,339,214 A | * | 8/1994 | Nelson | ........................ 361/695 |
| 5,704,212 A | * | 1/1998 | Erler et al. | .................... 62/3.2 |
| 5,784,256 A | * | 7/1998 | Nakamura et al. | .......... 361/699 |
| 6,049,455 A | * | 4/2000 | Nakamura et al. | |
| 6,058,009 A | * | 5/2000 | Hood, III et al. | ........... 361/687 |
| 6,058,012 A | * | 5/2000 | Cooper et al. | .............. 361/704 |
| 6,125,035 A | * | 9/2000 | Hood, III et al. | ........... 361/687 |
| 6,137,681 A | * | 10/2000 | Lu | ............................. 361/697 |
| 6,141,215 A | * | 10/2000 | Podwalny et al. | .......... 361/687 |
| 6,241,007 B1 | * | 6/2001 | Kitahara et al. | ........... 165/80.4 |
| 6,301,107 B1 | * | 10/2001 | Lev et al. | .................... 361/687 |
| 6,366,460 B1 | * | 4/2002 | Stone et al. | |

\* cited by examiner

*Primary Examiner*—Gerald Tollin
(74) *Attorney, Agent, or Firm*—Finnegan, Henderson, Farabow, Garrett & Dunner, L.L.P.

(57) ABSTRACT

A cooling unit for cooling a semiconductor package has a heat sink and an electric fan device. The heat sink includes a heat receiving portion for heat generated by the semiconductor package, and a heat exchange portion thermally connected to the heat receiving portion. The heat exchange portion is located adjacent to the heat receiving portion and separate from the semiconductor package. The heat sink is movable toward and away from the semiconductor package, and always urged by a plate spring toward the semiconductor package. The electric fan device sends cooling air at least to the heat exchange portion of the heat sink.

15 Claims, 10 Drawing Sheets

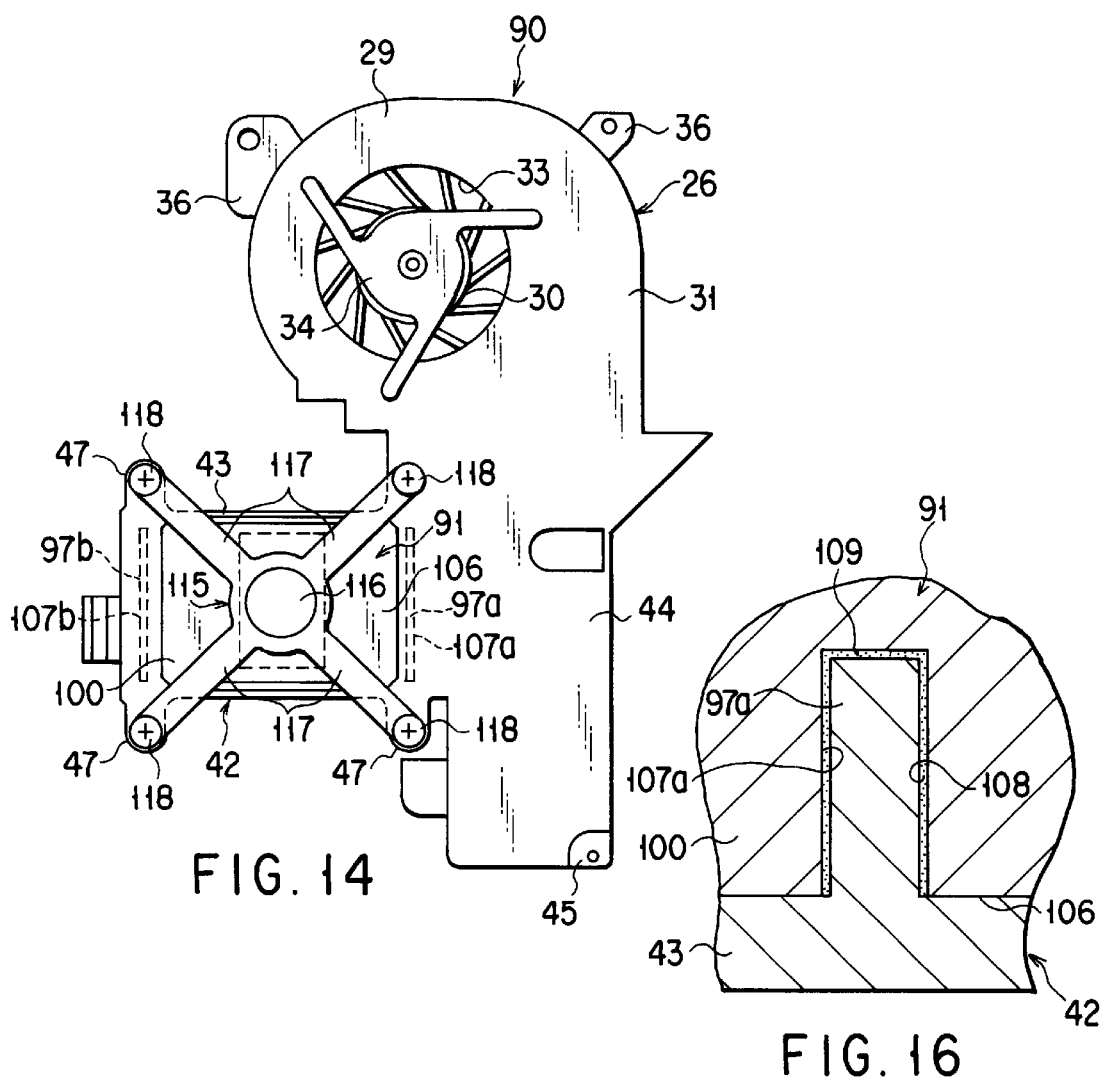
FIG. 14
FIG. 16
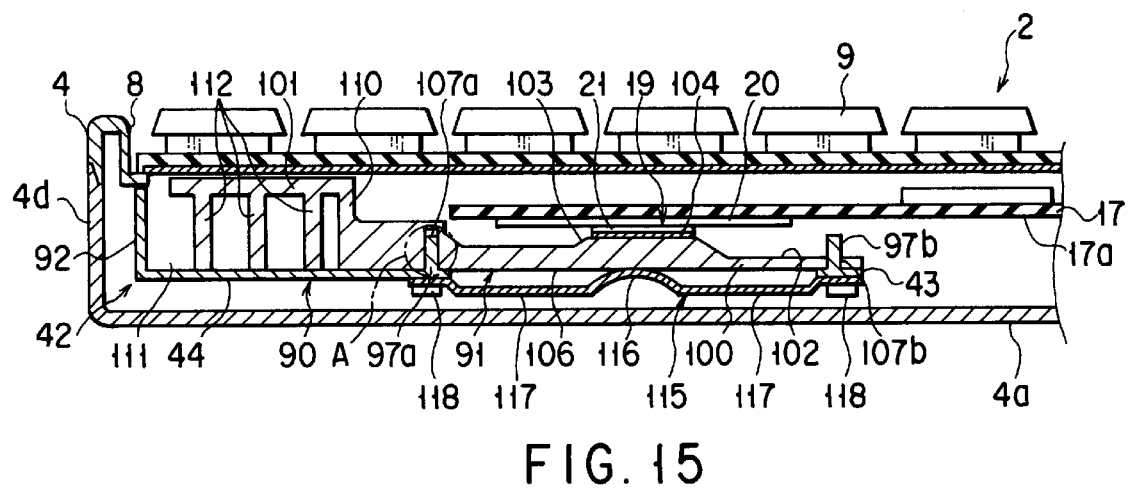
FIG. 15

COOLING UNIT FOR COOLING HEAT GENERATING COMPONENT AND ELECTRONIC APPARATUS HAVING THE COOLING UNIT

CROSS-REFERENCE TO RELATED APPLICATIONS

This application is based upon and claims the benefit of priority from the prior Japanese Patent Application No. 2000-001832, filed Jan. 7, 2000, the entire contents of which are incorporated herein by reference.

BACKGROUND OF THE INVENTION

The present invention relates to a cooling unit for facilitating the radiation of heat from a heat generating component such as a semiconductor package, and also an electronic apparatus, such as a portable computer, which incorporates the cooling unit.

In recent years, various types of portable electronic apparatuses, as typified by notebook-sized portable computers or mobile information apparatuses, have been developed. Electronic apparatuses of this type each incorporate a semiconductor package for processing multimedia information such as characters, voices and/or images. The power consumption of semiconductor packages increases more and more in accordance with increases in processing speed and/or increasing number of functions incorporated therein. Accordingly, the amount of heat generated during the operation of the packages is rapidly increasing. Therefore, in order to secure reliable operation of the semiconductor packages, it is necessary to facilitate their heat radiation. To this end, various types of radiation/cooling means such as a heat sink, an electromotive fan for supplying cooling air, etc. are indispensable.

The conventional heat sink has a heat receiving portion for receiving heat generated from a semiconductor package, and a heat exchange portion thermally connected to the heat receiving portion. This heat sink is fixed on a circuit board with the semiconductor package mounted thereon.

If a gap exists between the heat receiving portion of the heat sink and the semiconductor package, it serves as a heat insulating layer and interrupts transmission of heat from the semiconductor package to the heat sink. To avoid this, in the prior art, a thermal conductive grease or a flexible thermal conductive sheet is interposed between the heat receiving portion of the heat sink and the semiconductor package to enhance the adhesion therebetween.

As a surface-mount type semiconductor package for use in a portable computer, a BGA-type semiconductor package is generally used. Where the BGA-type semiconductor package is mounted on a circuit board, it is possible that the thickness of the package on the circuit board will vary within a range of ±0.25 mm. Further, since an injection molded product of an aluminum alloy is used as the heat sink, a dimensional tolerance will inevitably occur. Accordingly, where the heat sink is secured to the circuit board, the thickness from the heat receiving portion to the circuit board may vary between different heat sink products.

In light of this, in the prior art, when a semiconductor package is thermally connected to the heat receiving portion of a heat sink by a thermal conductive sheet, the thickness of the sheet is set at a value that exceeds a maximum gap due to, for example, the dimensional tolerance of the heat sink. This enables the thick thermal conductive sheet held between the semiconductor package and the heat receiving portion to be forcibly elastically deformed so as to absorb variations in thickness between mounted semiconductor packages or the dimensional tolerance of the heat sink.

However, the thermal conductive sheet is generally formed of a rubber elastic member of a low density, and hence has a lower thermal conductance than a metal material. Therefore, in the conventional structure that requires the use of a thick thermal conductive sheet, a thermally-connected portion of the semiconductor package and the heat receiving portion will have a high thermal resistance. As a result, the heat of the semiconductor package cannot effectively be transmitted to the heat sink. In other words, there is room for improvement in enhancing the radiation of the semiconductor package.

BRIEF SUMMARY OF THE INVENTION

It is the object of the invention to provide a cooling unit and an electronic apparatus, in which the adhesion of a heat generating component and a heat sink is kept high to enable effective transmission of heat from the heat generating component to the heat sink, and a thermal conduction path from the heat generating component to a heat exchange portion is formed thin and compact.

According to a first aspect of the invention, there is provided a cooling unit for cooling a heat generating component, comprising: a heat sink including a heat receiving portion for receiving heat generated by the heat generating component, and a heat exchange portion thermally connected to the heat receiving portion, the heat exchange portion being located adjacent to the heat receiving portion and separate from the heat generating component, the heat sink being movable toward and away from the heat generating component, the heat sink being urged by an elastic member toward the heat generating component; and ventilation means for sending cooling air at least to the heat exchange portion of the heat sink.

According to a second aspect of the invention, there is provided an electronic apparatus comprising: a housing; a heat generating component housed in the housing; a heat sink housed in the housing, and including a heat receiving portion for receiving heat generated by the heat generating component, and a heat exchange portion thermally connected to the heat receiving portion, the heat exchange portion being located adjacent to the heat receiving portion and separate from the heat generating component, the heat sink being movable toward and away from the heat generating component, the heat sink being urged by an elastic member toward the heat generating component; and ventilation means housed in the housing for sending cooling air at least to the heat exchange portion of the heat sink.

In the above-described structure, the heat of the heat generating component is transmitted to the heat receiving portion of the heat sink and then to the heat exchange portion of the same. Accordingly, the heat of the heat generating component is diffused over the entire heat sink and radiated to the outside of the heat sink. Heat diffusion and subsequent heat radiation is a natural cooling process. Since the ventilation means sends cooling air to the heat exchange portion, the heat exchange portion is forcibly cooled. Thus, the heat of the heat generating component is efficiently radiated from the heat exchange portion.

The heat receiving portion of the heat sink is movable toward and away from the heat generating component. If there is a variation in the thickness of the heat generating component or in the size of the heat sink, the movement of the heat sink can absorb the variation.

Moreover, since the heat receiving portion is always urged toward the heat generating component, the adhesion between the heat receiving portion and the heat generating component is kept high. Therefore, when providing a thermal conductive sheet between the heat receiving portion and the heat generating component, it is sufficient if the thermal conductive sheet has a thickness that enables the heat receiving portion and the heat generating component to be prevented from partially touching.

As a result, the thermal conductive sheet can be thinned to a required minimum limit.

Accordingly, the thermal resistance between the heat receiving portion and the heat generating component can be suppressed. This means that the heat of the heat generating component can be efficiently transmitted to the heat sink.

In addition, since, in the above-described structure, the heat receiving portion is not vertically parallel to the heat exchange portion, and the heat exchange portion is horizontally separate from the heat generating component, the thermal conduction path from the heat generating component to the heat exchange portion is formed horizontal. This enables the heat sink to be formed thin and hence to be easily incorporated in the housing.

According to a third aspect of the invention, there is provided a cooling unit for cooling a heat generating component, comprising: a heat sink including a heat receiving portion for receiving heat generated by the heat generating component, and a heat exchange portion thermally connected to the heat receiving portion, the heat exchange portion being located adjacent to the heat receiving portion and separate from the heat generating component; and an electric fan device for sending cooling air at least to the heat exchange portion of the heat sink, the electric fan device including a fan, a fan casing supporting the fan, and a heat sink support arranged adjacent to the fan casing.

The heat sink is pivotably supported by the heat sink support such that the heat receiving portion can move toward and away from the heat generating component, and the heat receiving portion is always urged by an elastic member toward the heat generating component.

In the above structure, if there is a variation in the thickness of the heat generating component or in the size of the heat sink, the variation can be absorbed by pivoting the heat sink. Further, since the heat receiving portion is always urged toward the heat generating component, the adhesion between the heat receiving portion and the heat generating component is kept high. Therefore, when providing a thermal conductive sheet between the heat receiving portion and the heat generating component, the thermal conductive sheet can be thinned to a required minimum limit. Accordingly, the thermal resistance between the heat receiving portion and the heat generating component can be suppressed, and hence the heat of the heat generating component can be efficiently transmitted to the heat sink.

In addition, in the above-described structure, the heat receiving portion is not vertically parallel to the heat exchange portion, the heat exchange portion is horizontally separate from the heat generating component, and the heat sink is not vertically parallel to the fan casing. Accordingly, the thermal conduction path from the heat generating component to the heat exchange portion is formed horizontal. This enables the cooling unit to be formed thin and compact.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 14 is a plan view showing the cooling unit of FIG. 12;

FIG. 15 is a sectional view of the portable computer of the second embodiment, showing the positional relationship between the heat sink and a semiconductor package; and FIG. 16 is an enlarged sectional view of a section indicated by reference letter A in FIG. 15.

DETAILED DESCRIPTION OF THE INVENTION

A portable computer according to a first embodiment of the invention will be described with reference to FIGS. 1–10.

Figure 1:
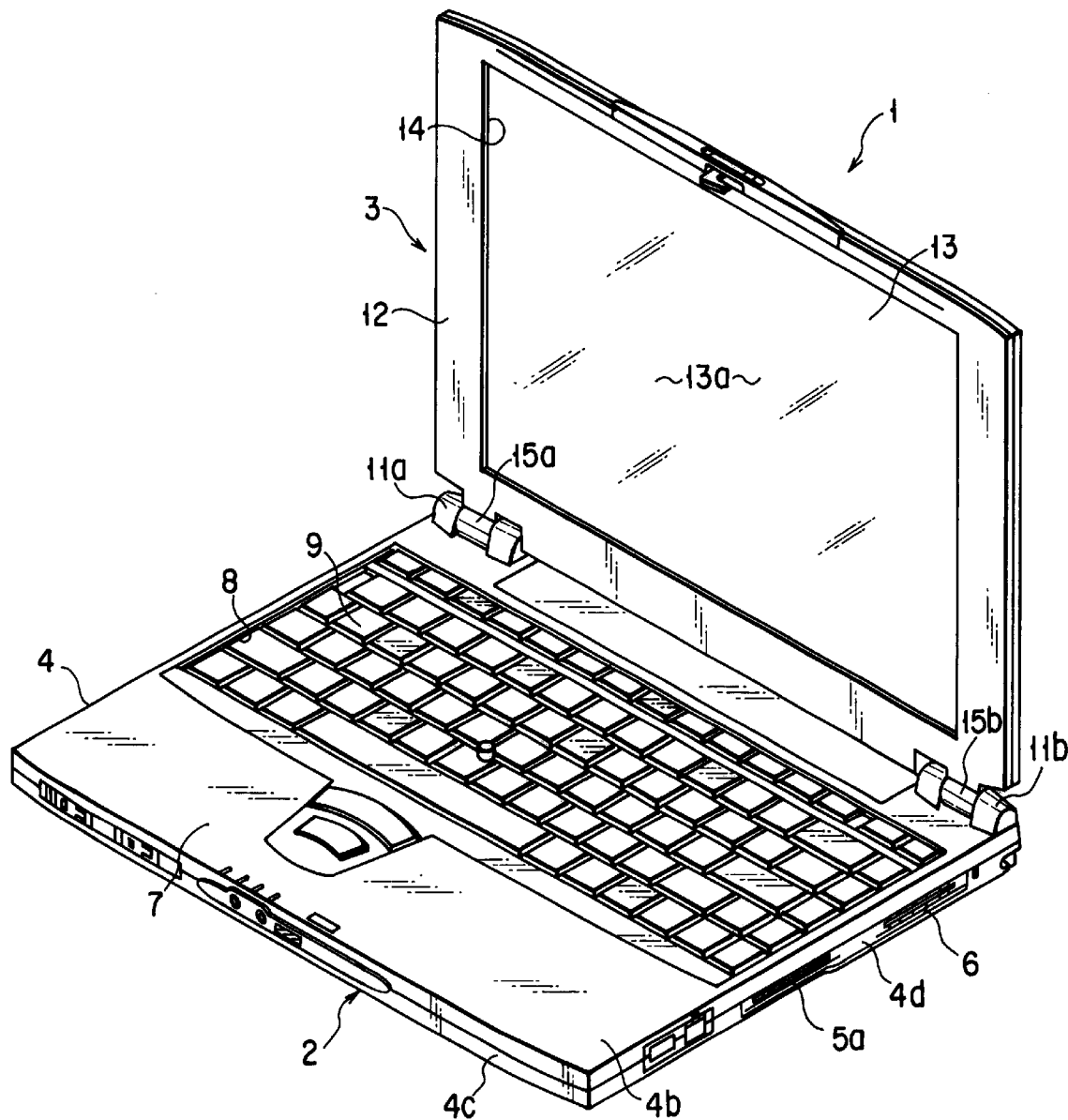
FIG. 1 is a perspective view illustrating a portable computer according to a first embodiment of the invention.

FIG. 1 shows a notebook-sized portable computer 1 as an electronic apparatus. The portable computer 1 includes a computer main body 2 and a display unit 3 supported by the computer main body 2.

The computer main body 2 has a box-shaped housing 4. The housing 4 is made of a metal that is light and has a high thermal conductivity, such as a magnesium alloy. The housing 4 has a bottom wall 4a, a top wall 4b, a front wall 4c, left and right side walls 4d and a rear wall 4e. The side walls 4d stand from the respective side edges of the bottom wall 4a. As shown in FIG. 1, the right side wall 4d of the housing 4 has a first suction port 5a and a discharge port 6. The first suction port 5a is located at a middle portion of the housing 4 in its depth direction. The discharge port 6 is located at a rear portion of the housing 4.

Figure 6:
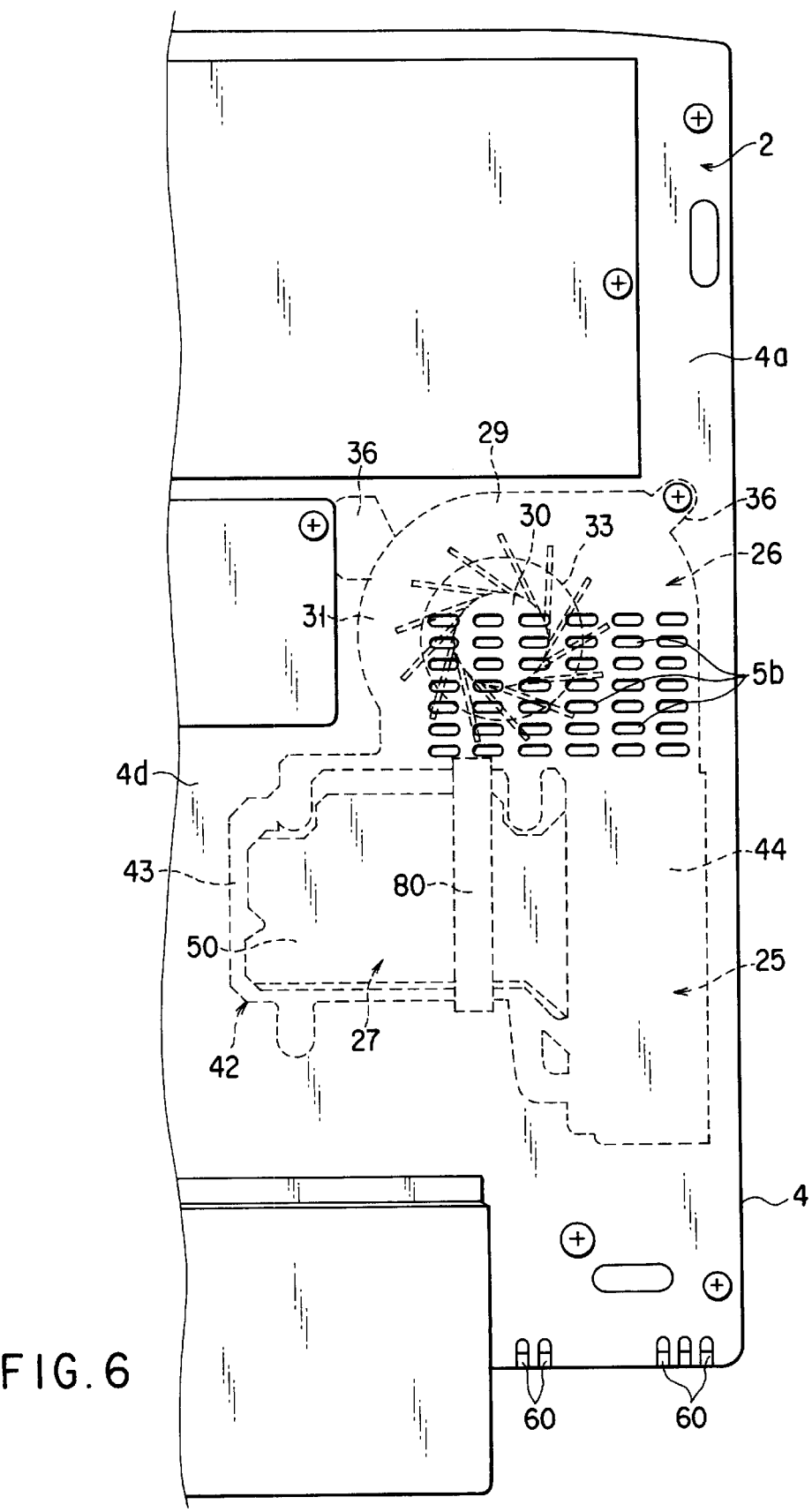
FIG. 6 is a plan view of the portable computer, illustrating the positional relationship between second suction ports formed in the bottom wall of the housing and the cooling unit.
Figure 7:
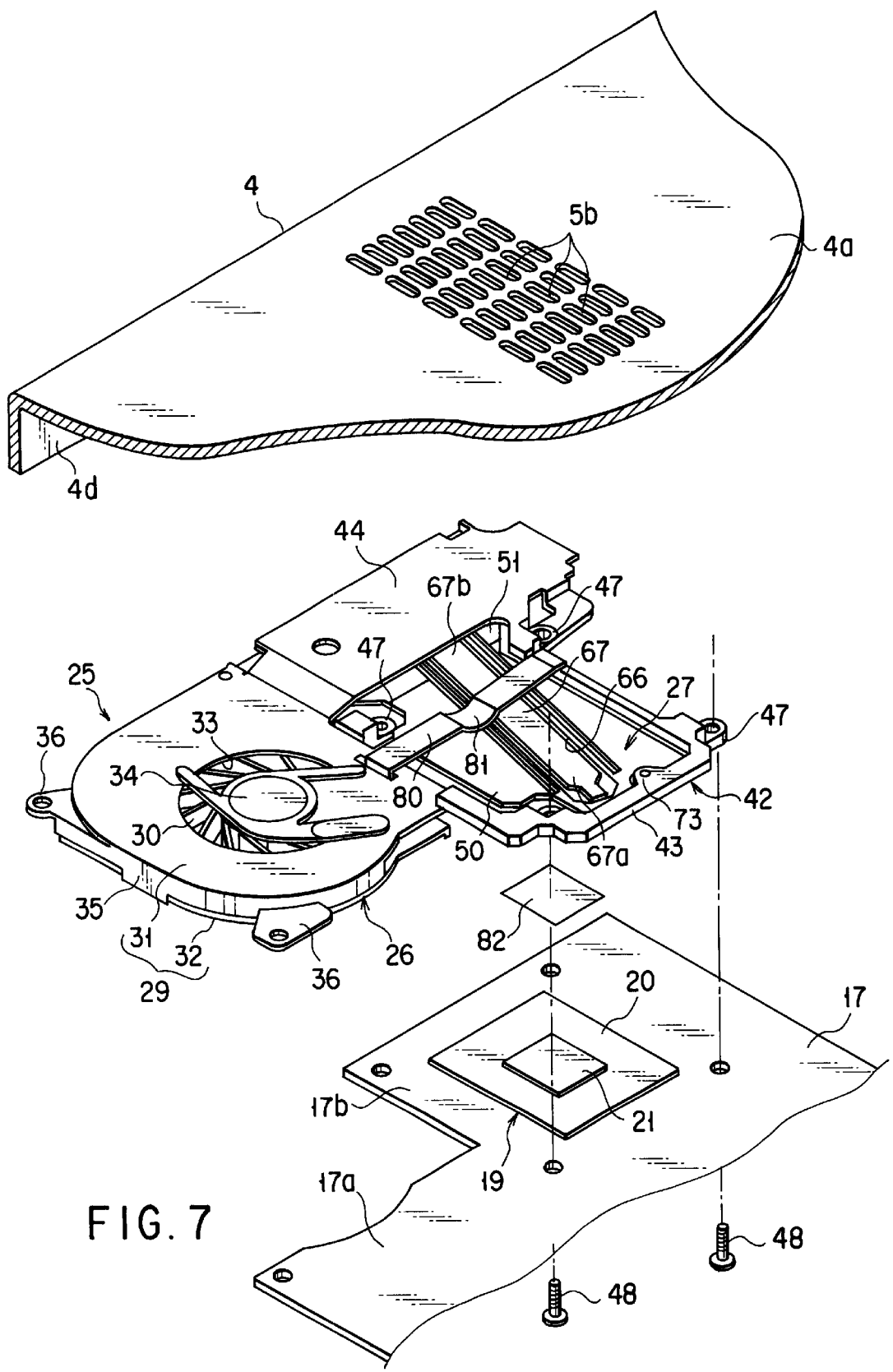
FIG. 7 is a perspective view illustrating the positional relationship between the second suction ports of the housing, the cooling unit and the BGA-type semiconductor package.

The bottom wall 4a of the housing 4 has multiple second suction ports 5b as shown in FIG. 6 or 7. The second suction ports 5b are located at a right end portion of the bottom wall 4a, adjacent to the first suction port 5a.

The top wall 4b of the housing 4 has a palm rest 7, a keyboard attachment recess 8 and a pair of display supports 11a and 11b. The palm rest 7 constitutes a front half portion of the housing 4 in its width direction. The keyboard attachment recess 8 receives a keyboard 9. The display supports 11a and 11b are located behind the keyboard 9, separated from each other in the width direction.

The display unit 3 includes a flat-box-shaped display housing 12 and a liquid crystal display device 13. The display housing 12 has a front surface provided with a rectangular opening 14. The liquid crystal display device 13 is housed in the display housing 12, and has a display screen 13a for displaying information such as characters, images, etc. The display screen 13a is exposed to the outside through the opening 14 of the housing 12.

The display housing 12 has a pair of legs 15a and 15b projecting from the lower edge of the housing 12 to the supports 11a and 11b, respectively. The legs 15a and 15b are attached to the housing 4 by respective hinges (not shown).

Accordingly, the display unit 3 is coupled to the housing 4 such that it can pivot between a closed position in which the unit 3 is folded onto the palm rest 7 and the keyboard 9, and an open position in which the palm rest 7, the keyboard 9 and the display screen 13a are exposed.

Figure 3:
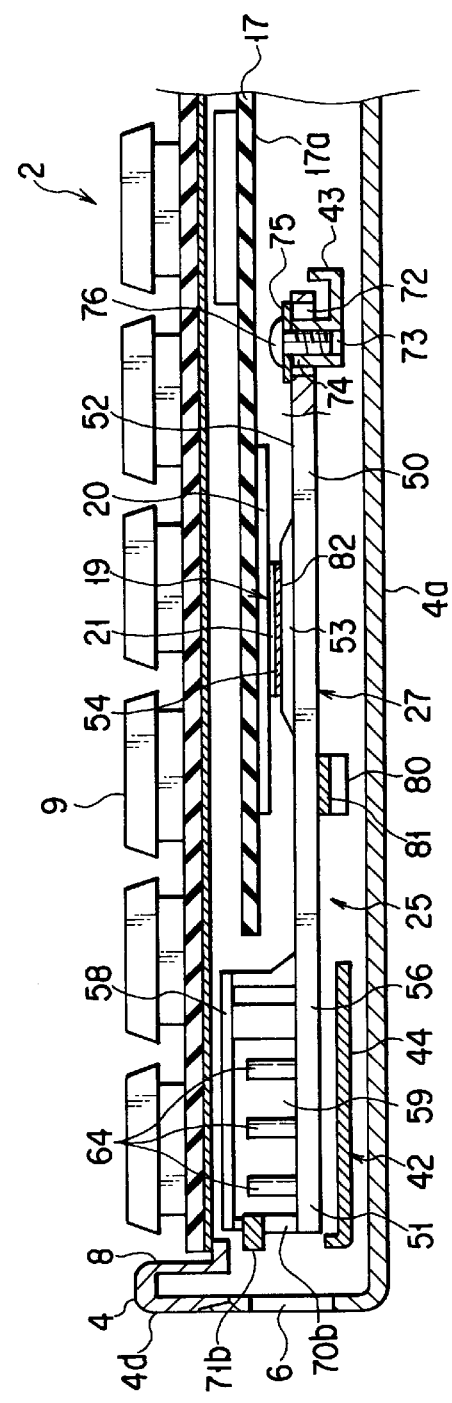
FIG. 3 is a sectional view of the portable computer, illustrating the positional relationship between a heat sink and a semiconductor package.
Figure 4:
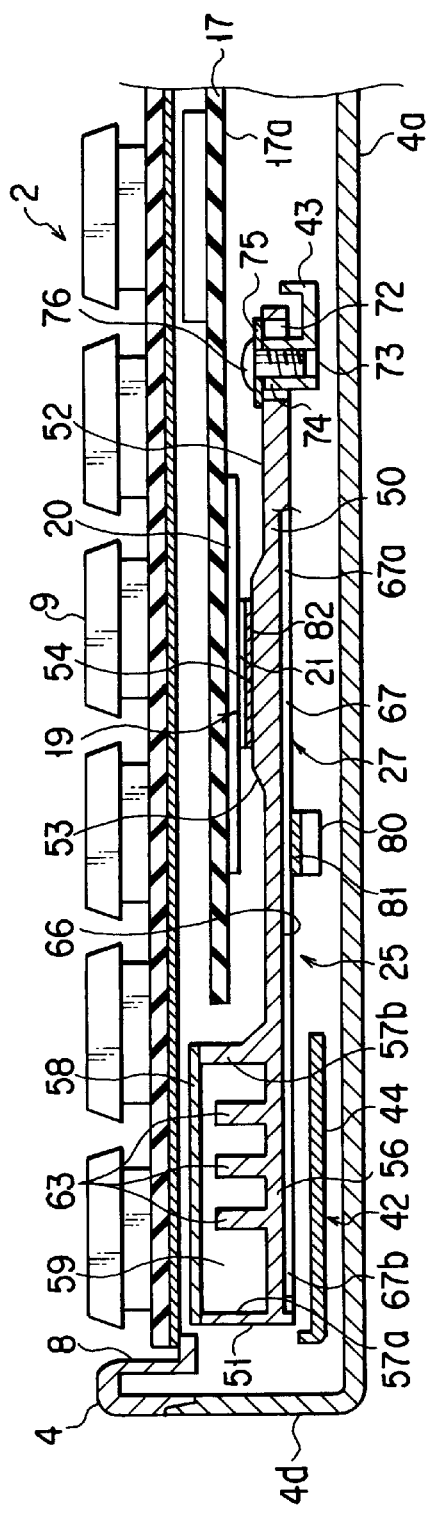
FIG. 4 is a sectional view of the portable computer, illustrating the positional relationship between a cooling air passage of a heat exchange portion and a heat receiving portion.

As shown in FIGS. 3 and 4, a circuit board 17 is housed in the housing 4. The circuit board 17 is located below the keyboard 9 and extends parallel to the bottom wall 4a of the housing 4. The circuit board 17 has a reverse surface 17a that is opposed to the bottom wall 4a and has a BGA-type semiconductor package 19 mounted thereon as a heat generating component. The semiconductor package 19 constitutes an MPU (Micro Processing Unit) as the nerve center of the portable computer 1, and is mounted on a mount area 17b that is situated at a right end portion of the reverse surface 17a of the circuit board 17.

Figure 5:
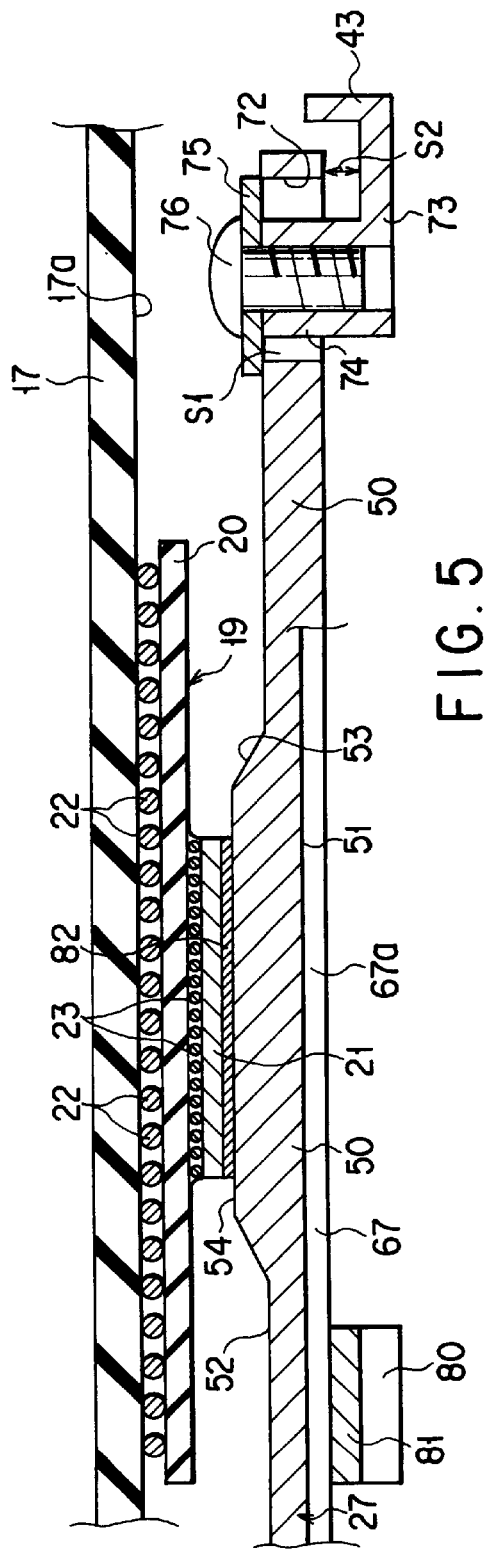
FIG. 5 is a sectional view illustrating thermal connection between a BGA-type semiconductor package and a heat receiving portion.

As shown in FIG. 5 or 7, the semiconductor package 19 has a rectangular base plate 20 and an IC chip 21. The base plate 20 is soldered to the reverse surface 17a of the circuit board 17 with multiple solder balls 22 interposed therebetween. The IC chip 21 is flip-chip bonded to a central portion of the base plate 20 with multiple solder balls 23 interposed therebetween. The IC chip 21 consumes a lot of power during operation since it processes, at high speed, multimedia information such as characters, voices and images. Accordingly, the IC chip 21 generates a lot of heat during operation, and hence must be cooled to maintain its stable operation.

Figure 2:
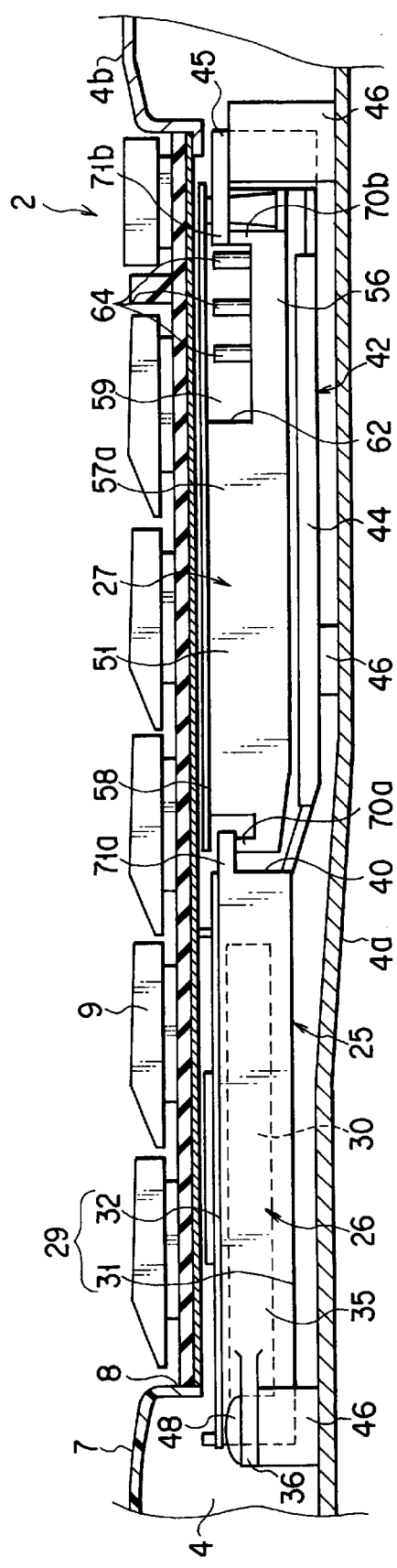
FIG. 2 is a sectional view of the portable computer, illustrating a state in which a cooling unit is housed in the housing of the computer.
Figure 11:
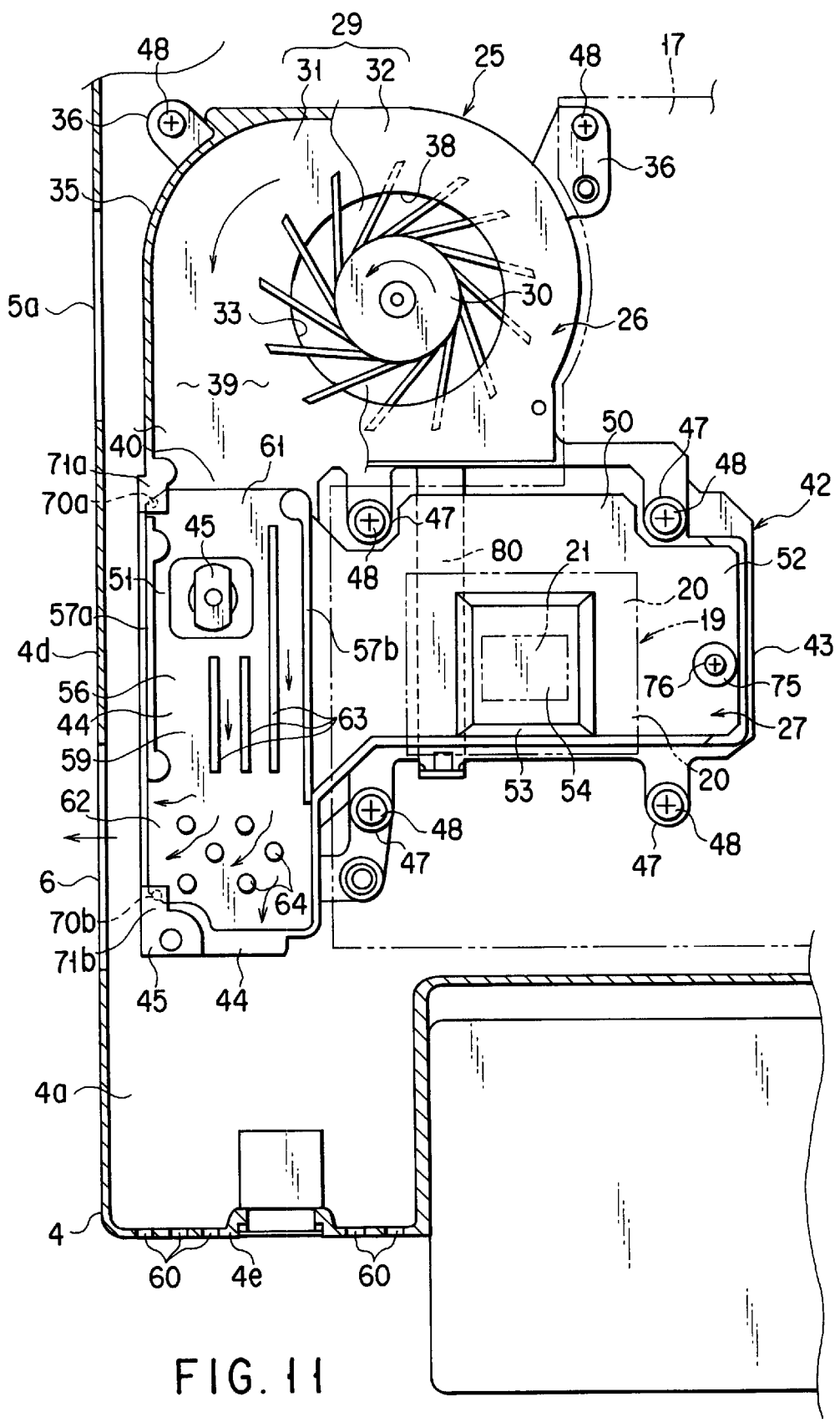
FIG. 11 is a sectional view of the portable computer, illustrating a state in which the cooling unit is housed in the housing.

As shown in FIGS. 2, 3 and 11, the housing 4 houses a cooling unit 25 for cooling the semiconductor package 19.

The cooling unit 25 extends from below a right end portion of the circuit board 17 to the right side wall 4d of the housing 4.

As most clearly illustrated in FIGS. 7–10, the cooling unit 25 has an electric fan device 26 as ventilation means and a heat sink 27. The electric fan device 26 includes a flat fan casing 29, a centrifugal fan 30 supported by the fan casing 29 and a flat motor (not shown) for driving the centrifugal fan 30.

The fan casing 29 has a base panel 31 and an upper panel 32 connected to the base panel 31. The base panel 31 is formed of a metal that is light and has an excellent thermal conductivity, such as an aluminum alloy or a magnesium alloy. As shown in FIG. 7, the base panel 31 is opposed to the bottom wall 4a of the housing 4. The base panel 31 has a first circular suction port 33 formed therein at a location slightly separate from a central portion thereof.

The base panel 31 has a motor support section 34 projecting to the inside of the first suction port 33. The centrifugal fan 30 is supported by the upper surface of the motor support section 34 with the aforementioned flat motor interposed therebetween. Accordingly, the centrifugal fan 30 is incorporated in the base panel 31 with its axis-of-rotation O1 directed vertically (i.e. the fan 30 rotates horizontally), and driven by the flat motor when the temperature of the IC chip 21 reaches a predetermined value.

The base panel 31 has a circumferential wall 35 that upwardly extends from its circumferential edge. The circumferential wall 35 surrounds the centrifugal fan 30, and has support chips 36 horizontally extending from two portions thereof.

The upper panel 32 is formed of a metal such as a stainless steel. The upper panel 32 is fixed on the upper end of the circumferential wall 35 and extends parallel to the base panel 31. The upper panel 32 has a second suction port 38. The second suction port 38 is opposed to the first suction port 33, and the centrifugal fan 30 is located between the first and second suction ports 33 and 38. An air passage 39 as shown in FIG. 11 is formed between the upper panel 32 and the base panel 31. The first and second suction ports 33 and 38 are located at the upstream end of the air passage 39.

Figure 10:
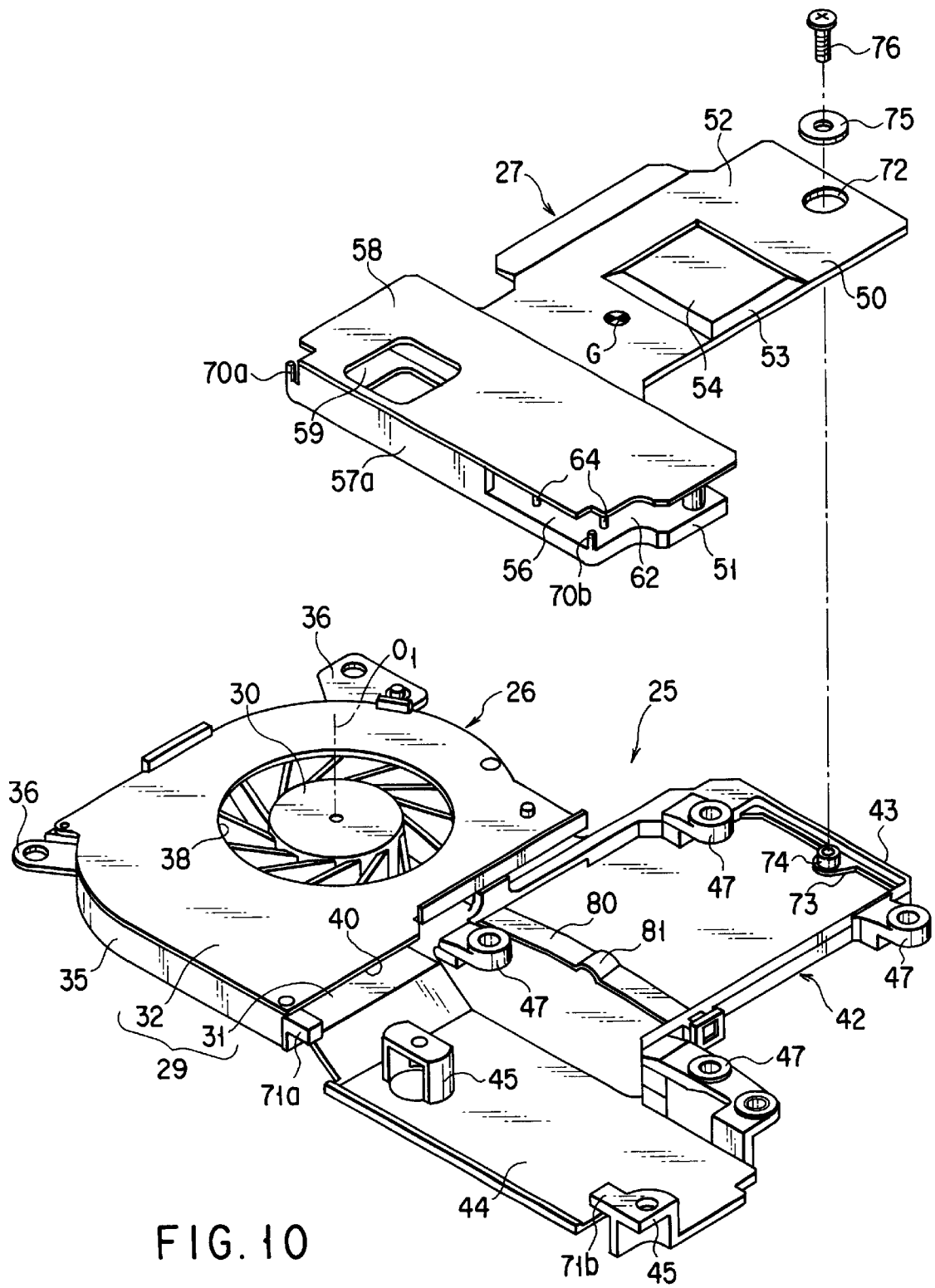
FIG. 10 is a perspective view of the cooling unit, showing the positional relationship between an electric fan device and the heat sink.

As illustrated in FIG. 10 or 11, the fan casing 29 has an discharge port 40, which is in the form of a slit extending in the width direction of the fan casing 29. The discharge port 40 is located at the downstream end of the air passage 39.

In the electric fan device 26 constructed as above, when the centrifugal fan 30 is driven, air is guided to the centrifugal fan 30 through the first and second suction ports 33 and 38. This air is radially outwardly discharged from a circumferential portion of the centrifugal fan 30 and introduced into the discharge port 40 through the air passage 39. Through the discharge port 40, the air is blown to the outside of the fan casing 29.

As shown in FIG. 10, the base panel 31 of the fan casing 29 has a heat sink support 42 integrated therewith as one body. The heat sink support 42 and the base panel 31 are adjacent to each other, and the discharge port 40 of the fan casing 29 is located at a junction of the heat sink support 42 and the base panel 31.

The heat sink support 42 has first and second sections 43 and 44 arranged adjacent to each other along the length of the discharge port 40. The first section 43 is in the form of a rectangular frame. The second section 44 is formed rectangular, has long sides longer than each side of the first section 43, and horizontally extends from the discharge port 40 to the outside The second section 44 has a plurality of seat sections 45. The seat sections 45 and the support chips 36 of the fan casing 29 are screwed, by respective screws 48, to a plurality of boss sections 46 (see FIG. 2) upwardly projecting from the bottom wall 4a of the housing 4. Thus, the heat sink support 42 and the fan casing 29 are arranged adjacent in the depth direction of the housing 4 and thermally connected to the bottom wall 4a of the housing 4.

As shown in FIG. 11, when the fan casing 29 is secured to the bottom wall 4a, the second section 44 of the heat sink support 42 extends along the right side wall 4d of the housing 4. Further, the second section 44 is located adjacent to the discharge port 6 formed in the right side wall 4d. In addition, as shown in FIG. 6, the first suction port 33 of the base panel 31 is opposed to the second suction ports 5b formed in the bottom wall 4a, while the second suction port 38 of the upper panel 32 is located near the first suction port 5a of the right side wall 4d. The upper panel 32 faces the lower surface of the keyboard 9.

The first section 43 of the heat sink support 42 is located between a right end portion of the circuit board 17 and the bottom wall 4a of the housing 4, facing the mount area 17b of the circuit board 17 on which the semiconductor package 19 is mounted. The first section 43 has four upwardly extending reception seats 47. The reception seats 47 touch the reverse surface 17a of the circuit board 17 outside the edges of the semiconductor package 19. The reception seats 47 are screwed to the circuit board 17 by respective screws 48. Where the reception seats 47 are secured to the circuit board 17, the semiconductor package 19 and the heat sink support 42 are positioned such that the semiconductor package 19 faces a part of the discharge port 40 of the fan casing 29.

The heat sink 27 is formed of a metal that is light and has an excellent thermal conductivity, such as an aluminum alloy or a magnesium alloy. The heat sink 27 comprises a heat receiving portion 50 and a heat exchange portion 51. The heat receiving portion 50 is formed of a rectangular plate member, and has a size that enables it to cover the semiconductor package 19 from below and to be fitted in the first section 43 of the heat sink support 42. Accordingly, the heat receiving portion 50 is surrounded by the sides of the first section 43.

The heat receiving portion 50 has an upper surface 52 opposed to the reverse surface 17a of the circuit board 17. A projection 53 slightly upwardly projects from a substantially central portion of the upper surface 52. The projection 53 has a flat upper surface that serves as a flat heat-receiving surface 54. The heat receiving surface 54 is opposed to the IC chip 21 of the semiconductor package 19.

As shown in FIG. 10, the heat exchange portion 51 is integrated as one body with the heat receiving portion 50 and thermally connected thereto. The heat exchange portion 51 extends from the heat receiving portion 50 such that the length of the portion 51 is perpendicular to that of the portion 50. The heat exchange portion 51 is received by the second section 44 of the heat sink support 42.

The heat exchange portion 51 has a rectangular bottom wall 56 extending from and at the same level as the heat receiving portion 50. A pair of side walls 57a and 57b upwardly extend from the long sides of the bottom wall 56. A rectangular metal cover plate 58 is secured to the upper ends of the side walls 57a and 57b.

As shown in FIG. 3 or 4, the cover plate 58 is located slightly above the circuit board 17 between the right end of the circuit board 17 and the right side wall 4d of the housing 4. The cover plate 58, the bottom wall 56 and the side walls 57a and 57b constitute a cooling air passage 59 incorporated in the heat exchange portion 51.

As illustrated in FIG. 11, the cooing air passage 59 linearly extends along the second section 44 of the heat sink support 42 in the depth direction of the housing 4. The cooling air passage 59 has a cooling air inlet 61 and a cooling air outlet 62. The cooling air inlet 61 is located at the upstream end of the cooling air passage 59 and opposed to the discharge port 40 of the fan casing 29. The cooling air outlet 62 is located at the downstream end of the cooling air passage 59, and opens at the side and at the rear of the heat exchange portion 51.

That part of the cooling air outlet 62, which opens at the side of the heat exchange portion 51, faces the discharge port 6 of the housing 4. on the other hand, that part of the cooling air outlet 62, which opens at the rear of the heat exchange portion 51, faces a right end portion of the rear wall 4e of the housing 4. A plurality of auxiliary discharge ports 60 are formed in a corner defined by the rear wall 4e and the bottom wall 4a.

As most clearly shown in FIGS. 3, 4 and 11, the heat exchange portion 51 has a plurality of first cooling fins 63 and a plurality of second cooling fins 64 provided on the upper surface of the bottom wall 56. The first and second cooling fins 63 and 64 are exposed to the cooling air passage 59. The first cooling fins 63 linearly extend along the length of the cooling air passage 59, parallel to each other with respective spaces interposed therebetween. The first cooling fins 63 are located upstream of the cooling air outlet 62 with respect to the flow of cooling air. The second cooling fins 64 are in the form of pins, arranged in a matrix and located downstream of the first cooling fins 63 with respect to the flow of cooling air.

As shown in FIGS. 4 and 7, a recess 66 is formed in the lower surface of the heat sink 27 such that it extends from the heat receiving portion 50 to the heat exchange portion 51. A flat heat pipe 67 as heat transfer means is buried in the recess 66. The heat pipe 67 includes a first end portion 67a and a second end portion 67b. The first and second end portion 67a and 67b are thermally connected to the heat receiving portion 50 and the heat exchange portion 51, respectively.

As shown in FIGS. 2 and 10, the bottom wall 56 of the heat exchange portion 51 has first and second fulcrums 70a and 70b upwardly projecting therefrom. The first fulcrum 70a is located at the cooling air inlet 61, while the second fulcrum 70b is located at the cooling air outlet 62. Thus, the first and second fulcrums 70a and 70b are separated from each other in the longitudinal direction of the cooling air passage 59.

When the heat exchange portion 51 of the heat sink 27 is mounted on the second section 44 of the heat sink support 42, the first and second fulcrums 70a and 70b are respectively positioned below support walls 71a and 71b that are respectively provided on the fan casing 29 and the second section 44. The ends of the first and second fulcrums 70a and 70b are opposed to the support walls 71a and 71b, respectively. The first and second fulcrums 70a and 70b are located on the heat exchange portion 51 remote from the heat receiving surface 54 of the heat receiving portion 50, with the cooling air passage 59 interposed therebetween.

As illustrated in FIG. 5 or 10, the heat receiving portion 50 of the heat sink 27 has a through hole 72 formed in an end portion thereof remote from the heat exchange portion 51. The heat receiving surface 54 is situated between the through hole 72 and the fulcrums 70a and 70b.

The first section 43 of the heat sink support 42 has a wall portion 73 extending below the through hole 72. A cylindrical boss 74 upwardly projects from the upper surface of the wall portion 73. The boss 74 has a height greater than the thickness of the heat receiving portion 50. The boss 74 is inserted in the through hole 72. A space S1 exists between the entire outer peripheral surface of the boss 74 and the entire inner surface of the through hole 72.

A screw 76 is screwed in the upper end of the boss 74. A washer 75 having a larger diameter than the through hole is provided on the upper surface 52 of the heat receiving portion 50 and aligned with the upper surface of the boss 74. Thus, the heat sink 27 is secured to the heat sink support 42 at the positions of the fulcrums 70a, 70b and the through hole 72.

Since the height of the boss 74 is greater than the thickness of the heat receiving portion 50 as shown in FIG. 5, a space S2 is defined between the upper surface of the wall portion 73 and the lower surface of the heat receiving portion 50. Accordingly, the heat sink 27 is supported by the heat sink support 42 so that it can vertically move in the thickness direction of the housing 4 by an amount corresponding to the space S2.

As shown in FIGS. 7 and 10, the first section 43 of the heat sink support 42 has a plate spring 80 as an elastic member. The plate spring 80 extends between two opposite sides of the first section 43 below the heat receiving portion 50 in the depth direction of the housing 4. When the cooling unit 25 is viewed from above, the plate spring 80 is situated between the heat receiving surface 54 of the heat receiving portion 50 and the heat exchange portion 51.

The plate spring 80 has a pressing section 81 upwardly and arcuately curved at a central portion thereof. The pressing section 81 elastically touches the lower surface of the heat receiving portion 50 at or in the vicinity of the center-of-gravity G of the heat sink 27, thereby raising the heat receiving portion 50. As a result, the fulcrums 70a and 70b of the heat sink 27 abut against the support walls 71a and 71b, respectively, and the upper surface of the heat receiving portion 50 abuts against the washer 75.

Accordingly, the heat sink 27 is movably supported by the heat sink support 42 so that the heat receiving surface 54 of the heat receiving portion 50 can pivot on the contact portions of the fulcrums 70a, 70b and the support walls 71a, 71b toward and away from the semiconductor package 19. At the same time, the heat sink 27 is always elastically urged by the plate spring 80 toward the semiconductor package 19.

As most clearly shown in FIG. 11, when the cooling unit 25 is viewed from above, the contact portions of the fulcrums 70a and 70b on which the heat sink 27 pivots, the washer 75 and the heat receiving portion 50 have a triangular positional relationship. Accordingly, the position of the heat sink 27 with respect to the heat sink support 42 is stabilized, thereby suppressing shaking of the heat sink 27.

As shown in FIGS. 3 to 5, a thermal conductive sheet 82 is interposed between the heat receiving surface 54 of the heat receiving portion 50 and the IC chip 21 of the semiconductor package 19. The thermal conductive sheet 82 is an elastic rubber member that is formed by, for example, adding alumina to silicone resin, and has a high thermal conductivity. The thermal conductive sheet 82 is thermally connected to the heat receiving surface 54 and the IC chip 21.

In the portable computer 1 constructed as above, when the IC chip 21 of the semiconductor package 19 generates heat, the heat is transmitted to the heat receiving portion 50 of the heat sink 27 via the thermal conductive sheet 82. Since the heat receiving portion 50 is thermally connected to the heat exchange portion 51 via the heat pipe 67, part of the heat transmitted to the heat receiving portion 50 is further transmitted to the first end portion 67a of the heat pipe 67. As a result, an operation liquid sealed in the heat pipe 67 is heated and evaporated, and vapor of the operation liquid flows from the first end portion 67a to the second end portion 67b of the heat pipe 67.

The vapor guided to the second end portion 67b of the heat pipe 67 radiates heat and condenses. The condensed operation liquid returns from the second end portion 67b to the first end portion 67a by a capillary force, and is again heated by the heat of the IC chip 21. The heat of the heat receiving portion 50 is actively transmitted to the heat exchange portion 51 by the repetition of the evaporation and condensation of the operation liquid.

Accordingly, the heat of the IC chip 21 transmitted to the heat receiving portion 50 is diffused to the entire heat sink 27, and radiated to the outside of the heat sink. Heat diffusion and subsequent heat radiation is a natural cooling process.

When the temperature of the IC chip 21 has reached a predetermined value, the centrifugal fan 30 of the electric fan device 26 is driven. In accordance with the rotation of the centrifugal fan 30, air outside the housing 4 is introduced therein through the first and second suction ports 5a and 5b. The introduced air is guided to the centrifugal fan 30 through the first and second suction ports 33 and 38 of the fan casing 29, and then discharged to the cooling air passage 39 from a circumferential portion of the centrifugal fan 30. Thus, the air introduced into the housing 4 is discharged as cooling air from the discharge port 40 of the fan casing 29.

Part of the discharge port 40 opens to the interior of the housing 4 and faces the semiconductor package 19, while the other part of the port 40 communicates with the cooling air inlet 61 of the cooling air passage 59. Accordingly, cooling air discharged from the discharge port 40 is guided to both the semiconductor package 19 and the cooling air passage 59.

Since a plurality of first cooling fins 63 extends in the cooling air passage 59 along its length, cooling air reaches the downstream end of the cooling air passage 59 after flowing along the first cooling fins 63. Further, since a plurality of second cooling fins 64 are arranged in a matrix at the downstream end of the cooling air passage 59, the cooling air guided by the first cooling fins 63 to the downstream end of the passage 59 weaves between the second cooling fins 64.

Accordingly, the contact area of the heat exchange portion 51 and the cooling air increases, and hence the exchange portion 51 is forcibly cooled by the cooling air. As a result, the degree of radiation of the heat exchange portion 51 increases, whereby the heat of the IC chip 21 transmitted to the heat exchange portion 51 is efficiently discharged.

As indicated by the arrows in FIG. 11, the cooling air flows at the downstream end of the cooling air passage 59 such that it weaves between the pin-shaped second cooling fins 64. Accordingly, the flow of the cooling air becomes a turbulent flow, which enables the cooling air to be diverted at the downstream end of the cooling air passage 59 toward the discharge port 6. The major part of the cooling air having forcibly cooled the heat exchange portion 51 is discharged from the discharge port 6 formed in the right side wall 4d of the housing 4. The remaining part of the cooling air is discharged to the interior of the housing 4 through the cooling air outlet 62 of the cooling air passage 59, and then discharged to the outside through the auxiliary discharge ports 60 formed in the rear wall 4e of the housing 4.

Since the cooling air has a turbulent flow at the downstream end of the cooling air passage 59, it is diffused to all the second cooling fins 64. In other words, all the second cooling fins 64 are brought into contact with the cooling air, and hence a sufficient contact area is secured between the heat exchange portion 51 and the cooling air. As a result, the heat exchange portion 51 can perform excellent heat radiation.

In addition, if the discharge port 6 of the housing 4 is partially blocked for some reason, the cooling air directed to the blocked portion is guided to another portion of the downstream end of the cooling air passage 59 through adjacent ones of the second cooling fins 64. Thus, the flow of the cooling air is not interrupted, and therefore a sufficient amount of cooling air flowing through the cooling air passage 59 can be secured, thereby preventing degradation of the radiation performance of the heat exchange portion 51.

Part of the cooling air discharged from the discharge port 40 of the fan casing 29 is directly guided to the semiconductor package 19. Accordingly, a flow of cooling air occurs around the semiconductor package 19, thereby cooling the semiconductor package 19 and/or the heat receiving portion 50. At the same time, since cooling air flows within the housing 4, the housing 4 has a high air permeability, which makes it difficult to accumulate heat around the semiconductor package 19. This further enhances the radiation performance of the semiconductor package 19.

As shown in FIG. 11, part of the cooling air outlet 62 opens to the side wall 57a of the heat exchange portion 51. Therefore, the distance from the part of the cooling air outlet 62 to the cooling air inlet 61 is shortened. This means that the length of a longitudinally central portion of the cooling air passage 59 is longer than that of a side portion of the passage 59 along the side wall 57a. Accordingly, the flow resistance of the cooling air is greater at the longitudinally central portion of the passage 59 than at the side portion of the passage 59 along the side wall 57a, and hence the amount of cooling air flowing through the central portion of the passage 59 is reduced. This being so, it is possible that the second cooling fins 64 located at the central portion of the cooling air passage 59 cannot effectively be used for radiation.

If in this case, the pitch of the second cooling fins 64 located near the side wall 57a is narrowed to increase the flow resistance of the cooling air flowing along the side wall 57a, a uniform flow distribution of the cooling air can be realized in the cooling air passage 59. As a result, the cooling air can be uniformly guided to all the second cooling fins 64, thereby enhancing the radiation performance of the heat exchange portion 51.

In the above-described cooling unit 25, the heat sink 27 for receiving heat generated from the semiconductor package 19 is movably supported by the heat sink support 42 of the fan casing 29, and always elastically urged by the plate spring 80 toward the IC chip 21 of the semiconductor package 19.

Therefore, even if the thickness of the semiconductor package 19 mounted on the circuit board 17 or the thickness of the heat receiving portion 50 of the heat sink 27 varies between different products, the heat sink 27 vertically pivots on contact portions of the fulcrums 70a and 70b and the support walls 71a and 71b, thereby absorbing variations in the thickness of the semiconductor package 19 or the heat receiving portion 50.

Moreover, since the heat receiving portion 50 of the heat sink 27 is urged against the IC chip 21, the heat receiving surface 54 of the heat receiving portion 50 is kept in tight contact with the IC chip 21. Therefore, when interposing the thermal conductive sheet 82 between the heat receiving surface 54 and the IC chip 21, it is sufficient if the thermal conductive sheet 82 has a thickness that enables the heat receiving surface 54 and the IC chip 21 to be prevented from partially touching, i.e. enables the heat of the IC chip 21 to be diffused on the entire heat receiving surface 54.

As a result, the thermal conductive sheet 82 can be thinned to a required minimum limit, and hence the thermal resistance that occurs at the thermal connection of the heat sink 27 and the IC chip 21 can be reduced. This means that the heat of the IC chip 21 can be efficiently radiated to the outside of the apparatus through the heat sink 27.

Furthermore, since in the above-described structure, the fulcrums 70a and 70b on which the heat sink 27 pivots are located remote from the heat receiving surface 54 of the heat receiving portion 50, with the heat exchange portion 51 interposed therebetween, there is a long distance between the fulcrums 70a, 70b and the heat receiving surface 54. Accordingly, when the heat sink 27 is rocked vertically, the heat receiving surface 54 of the heat sink 27 vertically moves while it is kept substantially parallel to the IC chip 21. As a result, partial contact between the IC chip 21 and the heat receiving surface 54 can be avoided, which means that the IC chip 21 and the heat receiving surface 54 can be kept in appropriate contact with each other.

Also, since the heat receiving portion 50 and the heat exchange portion 51 of the heat sink 27 are arranged adjacent to each other at the same level, the thermal conduction path from the IC chip 21 to the heat exchange portion 51 via the heat receiving portion 50 is flat. This enables the heat sink 27 to be formed thin and compact and hence to be easily incorporated in the housing 4 that is demanded to be made thin.

Figure 8:
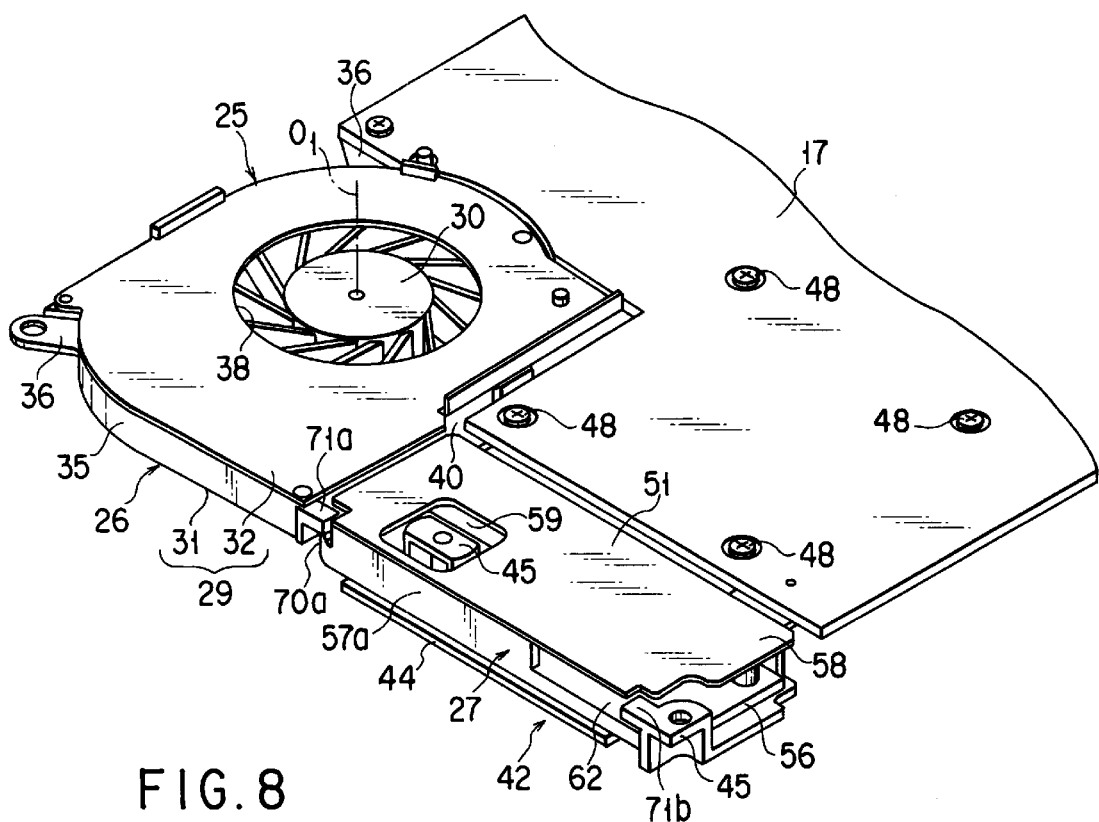
FIG. 8 is a perspective view illustrating a state in which the cooling unit is fixed on a circuit board.
Figure 9:
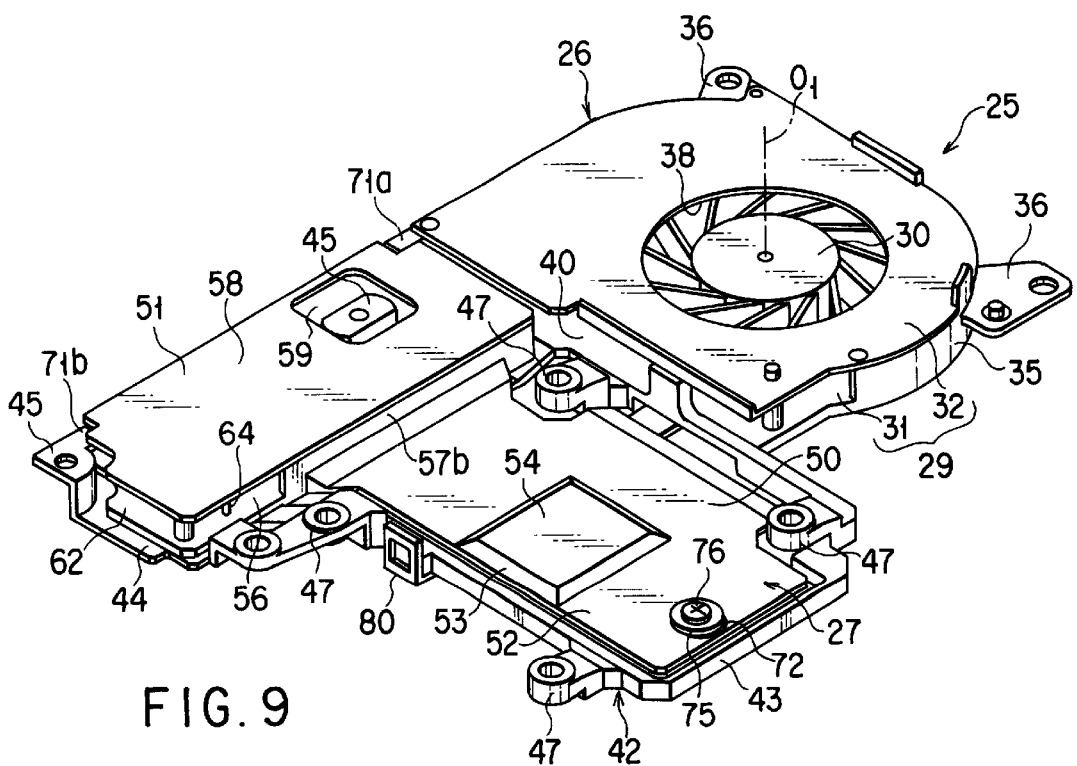
FIG. 9 is a perspective view showing the cooling unit.

In addition, as shown in FIG. 3 or 8, the heat exchange portion 51 having the cooling air passage 59 is horizontally separate from the circuit board 17, the position of the upper panel 32 as the ceiling of the cooling air passage 59 is not limited by the circuit board 17. Therefore, the upper panel 32 can be positioned at substantially the same level as the circuit board 17, thereby securing the height of the cooling air passage 59. This imparts a sufficiently large cross section to the cooling air passage 59, and hence a sufficient amount of cooling air can pass through the passage. At the same time, the first and second cooling fins 63 and 64 can have a sufficient height, and therefore have a sufficient area in contact with the cooling air. As a result, the radiation performance of the heat exchange portion 51 can be further enhanced.

Further, the pressing section 81 of the plate spring 80 is in contact with the lower surface of the heat receiving portion 50 at or in the vicinity of the center-of-gravity G of the heat sink 27. Accordingly, even when, for example, the portable computer 1 shakes, the pivotable heat sink 27 does not easily shake independently. This being so, the IC chip 21 is prevented from colliding with the heat receiving surface 54 or from being excessively pressed by it. This means that the semiconductor package 19 can have a high impact resistance.

Yet further, since, in the cooling unit 25, the heat sink support 42 is connected to the fan casing 29 of the electric fan device 26, it can be made of a simple shape that is suitable for surrounding the heat sink 27. Accordingly, the heat sink support 42 can be made light, which contributes to reducting the weight of the entire cooling unit 25. Therefore, even when, for example, the portable computer 1 shakes, a load applied to a connection section of the housing 4 and the cooling unit 25 can be reduced, and hence the attachment structure of the cooling unit 25 can be simplified.

Although, in the above-described first embodiment, a single cooling air passage is formed in the heat exchange portion of the heat sink, a plurality of cooling air passages may be formed therein.

Moreover, in the first embodiment, it is not always necessary to make the plate spring urging the heat receiving portion be in contact with the lower surface of the heat receiving portion at or in the vicinity of the center of gravity of the heat sink. Instead, the spring plate may be made to come into contact with those two portions of the lower surface of the heat receiving portion, between which the center of gravity of the heat sink is situated.

It is not necessary to make the first section of the heat sink support continuously surround the heat receiving portion of the heat sink. The first section may contain a space.

The invention is not limited to the above-described first embodiment. Referring now to FIGS. 12–16, a second embodiment of the invention will be described.

A cooling unit 90 according to the second embodiment is similar to the cooling unit employed in the first embodiment, except for the structure of a heat sink 91 for mainly receiving heat generated from an IC chip 21, and a structure for movably supporting the heat sink 91. Therefore, in the second embodiment, structural elements similar to those in the first embodiment are denoted by corresponding reference numerals, and no detailed description is given thereof.

Figure 12:
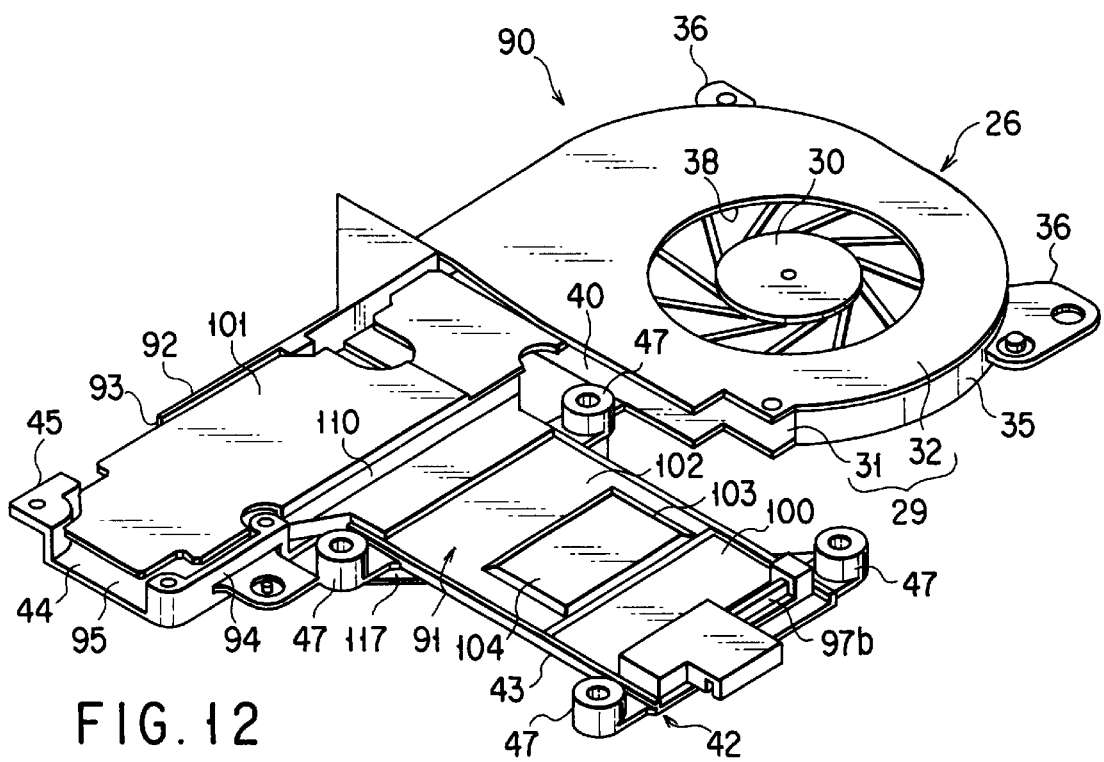
FIG. 12 is a perspective view illustrating a cooling unit according to a second embodiment of the invention.
Figure 13:
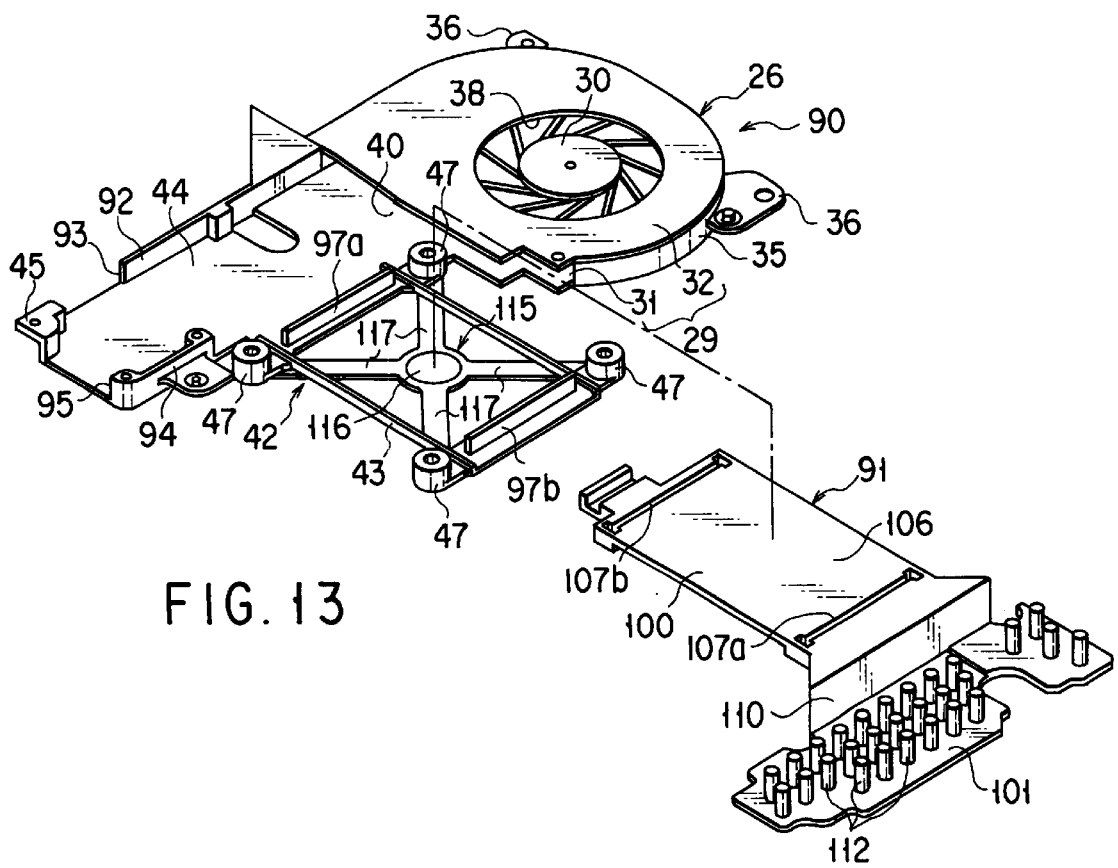
FIG. 13 is a perspective view of the cooling unit of FIG. 12, showing the positional relationship between an electric fan device and a heat sink.

As shown in FIG. 12 or 13, the second section 44 of the heat sink support 42 has a first side wall 92 upwardly projecting from an edge section thereof that is located remotely from the first section 43. The first side wall 92 has a first cooling air outlet 93. The first cooling air outlet 93 is remote from the fan casing 29 and opposed to the discharge port 6 of the housing 4.

The second section 44 of the heat sink support 42 has a second side wall 94 projecting upwardly. The second side wall 94 is opposed to the first cooling air outlet 93. A second cooling air outlet 95 is defined between the second side wall 94 and the first side wall 92, and opposed to the rear wall 4e of the housing 4.

The first section 43 of the heat sink support 42 has a pair of projections 97a and 97b as first fitting sections. The projections 97a and 97b are located on respective opposed sides of the first section 43. The projections 97a and 97b upwardly project from the upper surface of the first section 43, and extend parallel to each other in the depth direction of the housing 4.

As shown in FIGS. 12, 13 and 15, the heat sink 91 has a heat receiving portion 100 and a heat exchange portion 101. The heat receiving portion 100 is arranged to cover the semiconductor package 19 from below, and formed rectangular so that it is fitted in the first section 43. The heat receiving portion 100 has an upper surface 102 opposed to the reverse surface 17a of the circuit board 17. A projection 103 slightly upwardly projects on a substantially central portion of the upper surface 102. The upper end of the projection 103 forms a flat heat receiving surface 104. The heat receiving surface 104 is arranged to face the IC chip 21 of the semiconductor package 19.

The heat receiving portion 100 has a flat lower surface 106. A pair of recesses 107a and 107b as second fitting sections are formed in the lower surface 106. The recesses 107a and 107b are in the form of slits and extend in the depth direction of the housing 4. The projection 103 is situated between the recesses 107a and 107b.

The projections 97a and 97b of the first section 43 are fitted in the recesses 107a and 107b, whereby the heat sink 91 is vertically movably supported by the heat sink support 42. As a result, the heat sink 91 can move toward and away from the semiconductor package 19.

As shown in FIG. 16, a clearance 108 is defined between the projection 97a (97b) and the recess 107a (107b) for allowing their relative movement. The clearance 108 is filled with flexible grease 109 as a heat conductive material. The grease 109 has a higher thermal conductivity than air, and thermally connects the heat sink 91 to the heat sink support 42.

The heat exchange portion 101 of the heat sink 91 is formed rectangular and opposed to the second section 44 of the heat sink support 42. The heat exchange portion 101 is connected to an end of the heat receiving portion 100 via a connection wall 110, whereby the heat exchange portion 101 and the heat receiving portion 100 are integrated as one body. The connection wall 110 upwardly extends from the end of the heat receiving portion 100. Accordingly, the heat exchange portion 101 is situated at a higher level than the heat receiving portion 100 and at the same level as the circuit board 17.

As shown in FIG. 15, the heat exchange portion 101, the second section 44 and the first and second side walls 92 and 94 of the heat sink support 42, and the connection wall 110 are joined to form a cooling air passage 111. The upstream end of the cooling air passage 111 communicates with the discharge port 40 of the fan casing 29. The downstream end of the cooling air passage 111 communicates with the first and second cooling air outlets 93 and 95.

The lower surface of the heat exchange portion 101 faces the cooling air passage 111. Multiple pin-shaped radiation fins 112 are arranged on the lower surface of the heat exchange portion 101. The radiation fins 112 are arranged in a matrix in the cooling air passage 111.

As is shown in FIGS. 13–15, a spring member 115 as an elastic member is attached to the first section 43 of the heat sink support 42. The spring member 115 includes a semi-spherical pressing section 116, and four arm sections 117 radially extending from the pressing section 116. The arm sections 117 are screwed to the respective lower ends of the reception seats 47 by respective screws 118 such that the pressing section 116 of the spring member 115 is situated at a substantially central portion of the first section 43 of the heat sink support 42. The pressing section 116 of the spring member 115 is in elastic contact with the lower surface 106 of the heat receiving portion 100 of the heat sink 91, thereby raising the heat receiving portion 100. This being so, the heat receiving surface 104 of the heat sink 91 is always elastically urged toward the semiconductor package 19.

In the above-described structure, the heat sink 91 for receiving heat generated from the semiconductor package 19 is vertically movably supported by the heat sink support 42, and is elastically urged by the spring member 115 toward the IC chip 21 of the semiconductor package 19.

Accordingly, even if there is a variation in the thickness of the semiconductor package 19 mounted on the circuit board 17 and/or in the thickness of the heat receiving portion 100 of the heat sink 91, the heat sink 91 vertically moves along those projections 97a and 97b of the first section 43 of the heat sink support 42, which are fitted in the recesses 107a and 107b of the heat receiving portion 100, thereby absorbing the variation in the thickness.

Moreover, since a force urging the heat receiving portion 100 of the heat sink 91 toward the IC chip 21 is always applied to the heat receiving portion 100, the adhesion between the heat receiving portion 100 and the IC chip 21 is kept high. Therefore, when interposing the thermal conductive sheet 82 between the heat receiving surface 104 and the IC chip 21, it is sufficient if the thermal conductive sheet 82 has a thickness that enables the heat receiving surface 104 and the IC chip 21 to be prevented from partially touching, i.e. enables the heat of the IC chip 21 to be diffused on the entire heat receiving surface 104.

As a result, the thermal conductive sheet 82 can be thinned to a required minimum limit, and hence the thermal resistance that occurs at the thermal connection of the heat sink 91 and the IC chip 21 can be reduced. This means that the heat of the IC chip 21 can be efficiently radiated to the outside of the apparatus through the heat sink 91.

Also, since the heat receiving portion 100 and the heat exchange portion 101 are arranged adjacent to each other, the thermal conduction path from the IC chip 21 to the heat exchange portion 101 via the heat receiving portion 100 is flat. This enables the heat sink 91 to be formed thin and compact and hence to be easily incorporated in the housing 4 that is demanded to be made thin.

Furthermore, in the above structure, the heat receiving portion 100 of the heat sink 91 is thermally connected to the first section 43 of the heat sink support 42 via the projections 97a and 97b fitted in the recesses 107a and 107b, respectively. Accordingly, the heat of the IC chip 21 transmitted to the heat receiving portion 100 can be quickly transmitted to the fan casing 29 via the heat sink support 42. This means that the heat sink support 42 and the fan casing 29 connected thereto can be used as radiator components, thereby enhancing the radiation performance of the heat sink 91.

In addition, since the clearance 108 between the projection 97a (97b) and the recess 107a (107b) is filled with grease 109, the thermal resistance of the thermally-connected portion of the heat receiving portion 100 and the heat sink support 42 can be minimized. At the same time, when vibration occurs from the outside to the cooling unit 90, vibration transmitted from the heat sink support 42 to the heat sink 91 can be attenuated by the grease 109.

This being so, the IC chip 21 is prevented from colliding with the heat receiving surface 104, or from being excessively pressed by it, with the result that the semiconductor package 19 can have a high impact resistance.

The present invention is not limited to the above-described embodiments, but may be modified in various ways without departing from its scope.

For example, although, in the above-described embodiments, a thermal conductive sheet is provided between the IC chip of the semiconductor package and the heat receiving portion of the heat sink, thermal conductive grease may be provided therebetween, instead of the thermal conductive sheet. Depending upon the situation, the heat receiving portion may be in direct contact with the IC chip, without any thermal conductive sheet or grease.

Yet further, it is not always necessary to integrate the heat receiving portion and the heat exchange portion of the heat sink with each other. These elements may be formed as separate bodies and connected to each other by, for example, a screw.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A cooling unit comprising:
a heat sink including a fulcrum a heat receiving portion thermally connected to a heat generating component, and a heat exchange portion thermally connected to the heat receiving portion, the heat exchange portion being located adjacent to the heat receiving portion; and
an electric fan device for sending cooling air at least to the heat exchange portion of the heat sink, the electronic fan device including a fan, a fan casing supporting the fan, and a heat sink support arranged adjacent to the fan casino and having a support wall
wherein the heat sink is pivotably supported by the heat sink support through abutment of the support wall of the heat sink support and the fulcrum of the heat sink such that the heat receiving portion can move toward and away from the heat generating component.

2. The cooling unit according to claim 1, further comprising a thermal conductive sheet interposed between the heat receiving portion and the heat generating component for thermally connecting the heat receiving portion to the heat generating component.

3. The cooling unit according to claim 1, wherein the fulcrum is located on that side portion of the heat exchange portion, which is remote from the heat receiving portion.

4. The cooling unit according to claim 1, wherein the heat sink support and the heat sink are thermally connected to each other.

5. The cooling unit according to claim 3, wherein the heat sink support has a first section that surrounds the heat receiving portion of the heat sink, and a second section that has the support wall against which the fulcrum of the heat sink abuts, the first and second sections being adjacent to each other.

6. An electronic apparatus comprising:
a housing;
a heat generating component housed in the housing;
a heat sink support having a projection;
a heat sink housed in the housing, and including a heat receiving portion thermally connected to the heat generating component, and a heat exchange portion thermally connected to the heat receiving portion, the heat sink having a recess fitted with the projection of the heat sink support such that the heat sink is movable toward and away from the heat generating component, the heat sink being urged by an elastic member toward the heat generating component; and
a fan device housed in the housing for sending cooling air at least to the heat exchange portion of the heat sink.

7. The electronic apparatus according to claim 6, further comprising a circuit board housed in the housing, the circuit board having an area on which the heat generating component is mounted, the area being opposed to the heat receiving portion of the heat sink.

8. The electronic apparatus according to claim 6, wherein the fan device includes a fan for sending the cooling air, a fan casing supporting the fan, and a heat sink support connected to the fan casing, the fan casing and the heat sink support being arranged adjacent to each other, and the heat sink being movably supported by the heat sink support via the elastic member.

9. The electronic apparatus according to claim 8, wherein the heat exchange portion of the heat sink has at least one cooling air passage into which the cooling air is introduced, and a cooling air outlet located at a downstream end of the cooling air passage.

10. The electronic apparatus according to claim 9, wherein the housing has a bottom wall and a side wall standing from an edge of the bottom wall, the heat sink and the fan device being arranged adjacent along the bottom wall, the heat exchange portion of the heat sink being located along the side wall of the housing, the side wall having a discharge port at a location corresponding to the cooling air outlet.

11. The electronic apparatus according to claim 10, wherein the cooling air passage has a plurality of cooling fins arranged in a matrix at a location corresponding to the cooling air outlet.

12. The cooling unit according to claim 1, further comprising an elastic member always pressing the heat receiving portion toward the heat generating component.

13. The electronic apparatus according to claim 6, further comprising a thermal conductive sheet interposed between the heat receiving portion and the heat generating component for thermally connecting the heat receiving portion to the heat generating component.

14. The electronic apparatus according to claim 13, wherein the heat generating component is a semiconductor package forming a micro processing unit, the semiconductor package containing an IC chip generating heat during an operation.

15. An electronic apparatus comprising:

a housing;

a heat generating component housed in the housing;

a heat sink housed in the housing, and including a fulcrum a heat receiving portion thermally connected to the heat generating component, and a heat exchange portion thermally connected to the heat receiving portion, the exchange portion being located adjacent to the heat receiving portion and having a support wall, and an electric fan device housed in the housing for sending cooling air at least to the heat exchange portion of the heat sink, the electric fan device including a fan, a fan casing supporting the fan, and a heat sink support arranged adjacent to the fan casing, wherein the heat sink is pivotably supported by the heat sink support through abutment of the support wall of the heat sink support and the fulcrum of the heat sink such that the heat receiving portion can move toward and away from the heat generating component.

* * * * *

UNITED STATES PATENT AND TRADEMARK OFFICE
CERTIFICATE OF CORRECTION

PATENT NO.    : 6,442,025 B2
DATED         : August 27, 2002
INVENTOR(S)   : Nakamura et al.

It is certified that error appears in the above-identified patent and that said Letters Patent is hereby corrected as shown below:

Column 16,
Line 9, change "a fulcrum" to -- a fulcrum, --.
Line 18, change "casino" to -- casing --, and change "wall" to -- wall, --.

Column 18,
Line 7, change "fulcrum" to -- fulcrum, --.

Signed and Sealed this

Twenty-second Day of April, 2003

JAMES E. ROGAN
*Director of the United States Patent and Trademark Office*